United States Patent [19]

Spainhour et al.

[11] 4,295,634
[45] Oct. 20, 1981

[54] STRUT COMPRESSOR

[75] Inventors: Phillip A. Spainhour, Waukegan; Leonard A. Morrison, Chicago; Robert S. Hampton, Jr., Wadsworth, all of Ill.

[73] Assignee: Ammco Tools, Inc., North Chicago, Ill.

[21] Appl. No.: 164,801

[22] Filed: Jun. 30, 1980

[51] Int. Cl.³ .............................................. B23P 19/04
[52] U.S. Cl. ...................................... 254/10.5; 29/227
[58] Field of Search ................. 254/10.5; 29/215–218, 29/225, 227, 252

[56] References Cited

U.S. PATENT DOCUMENTS

| | | | |
|---|---|---|---|
| 2,948,057 | 8/1960 | Dagenais | 254/10.5 |
| 3,814,382 | 6/1974 | Castoe | 254/10.5 |
| 3,883,116 | 5/1975 | Buccino | 254/10.5 |
| 4,009,867 | 3/1977 | Diffenderfer | 254/10.5 |

*Primary Examiner*—Robert C. Watson
*Attorney, Agent, or Firm*—Edmond T. Patnaude

[57] ABSTRACT

A MacPherson Strut Compressor, with which a strut may be safely dismantled for repair, employs a fluid operated piston-cylinder, mounted to an adjustable upper platen to provide compression between a push platen and a lower base platen.

5 Claims, 4 Drawing Figures

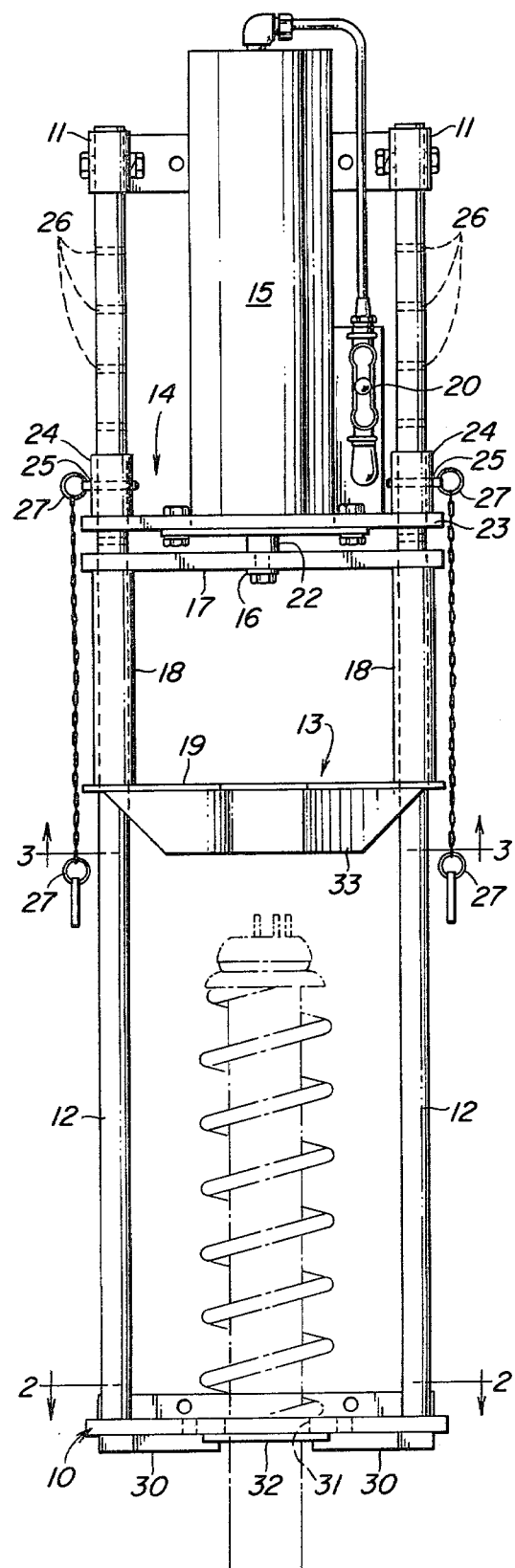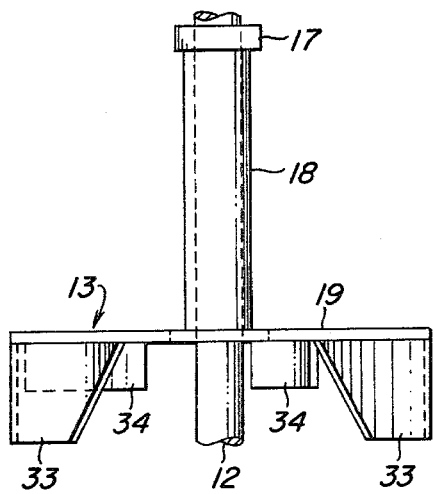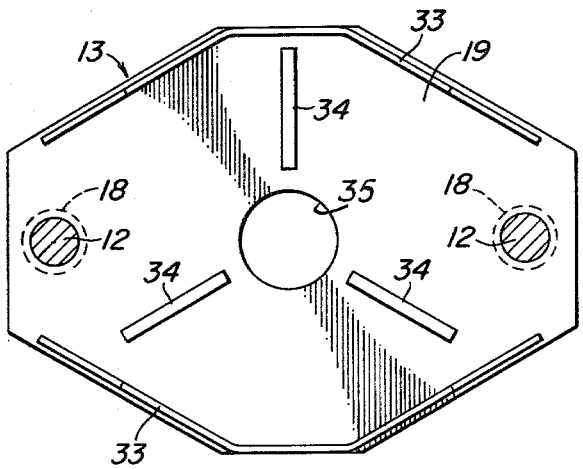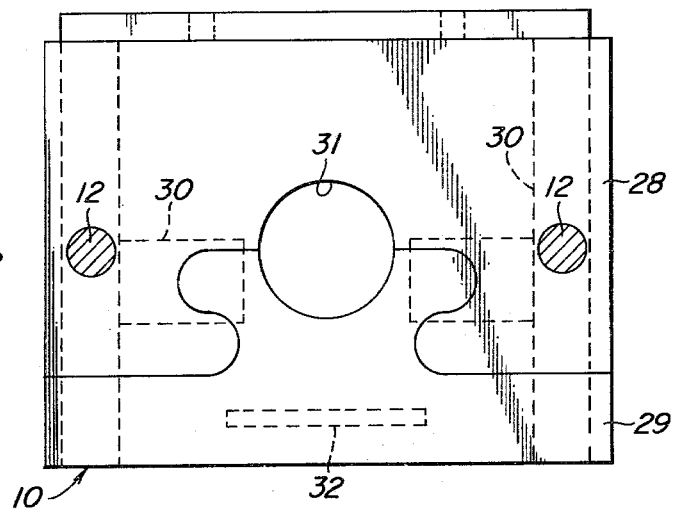

STRUT COMPRESSOR

The present invention relates in general to a tool to control spring compression during repair of a spring-loaded device, and it relates in particular to a new and improved MacPherson strut compressor which employs a positionable piston-cylinder assembly which protracts or controls retraction of a push platen to compress or decompress a MacPherson Strut spring between it and a lower base platen.

BACKGROUND OF THE INVENTION

MacPherson Struts have been incorporated into many late model domestic and foreign cars. Such a strut employs a spring which is held in compression by a shock absorber. In order to repair such a strut it is necessary to hold the spring in a compressed state while the strut is disassembled. The prior art devices have not been altogether satisfactory for reasons of safety, manufacturing costs and ease of use.

SUMMARY OF THE INVENTION

Beifly, in accordance with the present invention there is provided a strut compressor employing a two piece lower base platen which locks the base of a spring-loaded strut keeping it secured during decompression.

A push platen which contains safety plates which protect the operator from the jack-knife effect of a failed strut, controls compression and decompression of the strut during dismanteling and reassembly.

GENERAL DESCRIPTION OF THE DRAWINGS

A better understanding of the present invention can be had by reference to the following detailed description taken in connection with the accompanying drawing wherein:

FIG. 1 is a front elevation of a strut compressor embodying the present invention;

FIG. 2 is an enlarged cross-sectional view taken along the line 2—2 in FIG. 1 providing a bottom view of the push-platen assembly;

FIG. 3 is a cross-sectional view taken along the line 3—3 in FIG. 1 and showing an enlarged bottom view of the push-platen assembly; and FIG. 4 is an enlarged side view of the push-platen assembly shown in FIG. 3.

DETAILED DESCRIPTION OF THE INVENTION

Referring to FIG. 1, a strut compressor comprises a strut compressor lower platen 10 fixedly attached to two upright support rails 12. The rails 12 are held in parallel relationship by means of a pair of brackets 11 at the top and bottom. The support rails 12 guide a push platen assembly 13 during strut compression.

The push-platen assembly 13 consists of an upper push-platen bracket 17 rigidly fixed to two push-platen tubular slide pieces 18 which are in turn rigidly fixed to a push-platen 19. The piston-cylinder assembly 15 provides controlled compression through piston-rod connection 16 to the push-platen assembly 13.

The tubular slides 18 guide the push-platen assembly 13 in a vertical direction along the support rails 12. An upper platen assembly 14 comprises the fluid operated piston-cylinder 15 which is controlled by a two-way directional control valve 20. When manually depressed in one direction, the cylinder 20 is pressurized to protract a piston rod 22, and when the control valve is manually depressed in the opposite direction cylinder pressure is exhausted thus allowing the cylinder rod 22 to be retracted.

Piston-cylinder 15 is rigidly fixed to a cylinder support plate 23, and two tubular guides 24 fixed to the plate 23 guide the assembly 14 for movement in a vertical direction along the support rails 12.

The upper platen assembly 14 is held in position by first aligning guide holes 25 in each of the tubular guides 24 with respective ones of a plurality of positioning holes 26 located in increments along the support rails 12. Once the positioning holes are selected, locking pins 27 are inserted in the holes to fix the upper platen assembly 14 on the rails 12.

In order to enable the use of this strut compressor with various different strut designs, and as best shown in FIG. 2, the strut compressor lower platen 10 is comprised of two interfitted, invertible parts. As shown, the rigidly mounted rear part 28 is affixed to the two support rails 12, and the removable front base piece 29 is interfitable and invertible with the rear base piece 28. A shim 32 on one face only of the front base piece 29 is used when repairing certain strut designs which have contoured bases and which otherwise would not seat securely on the lower platen.

Two base platen brackets 30, shown in hidden lines in FIG. 2 are mounted to the rear base piece 28 and support the front base piece 29 so that a circular base cutout 31 may receive the lower end of the strut.

In order to protect the operator from a jack-knifing strut, and as best shown in FIG. 3, two metal safety shields 33 are mounted to the bottom surface of the push-platen 13. Three strut stand-offs 34 eliminate interference from three strut mounting bolts when the platen 13 moves down against the top of the strut. A central circular cutout 35 in the platen 13 provides the access for removal of an upper shock-absorber mounting nut which is secured to the top of the strut.

Referring to FIG. 4 a side view of the push-platen assembly 13 shows the push platen bracket 17 coupled to the push plate 19 by the tubular slide bracket 18.

OPERATION

The MacPherson Strut compressor is used to disassemble and reassemble MacPherson struts. The procedure for strut repair is as follows:

Remove the front base piece 29 from the lower platen 10, and place the strut in the circular base cut out 31. Replace the front base piece 29, locking the strut in place, then position the strut so its lower flange rests squarely on the compressor base. Some strut designs will not sit squarely on the base surface, in which case the side of the base piece with the shim 32 should be on top in order to help support the strut.

With the strut securely positioned, remove the lock pins 27 from the upper-platen assembly 14 and position the push-plate 19 just above the top of the strut, replacing the lock pins 27 to secure the upper platen assembly in place on the rails 12.

With the push platen assembly 13 in place, slowly apply pressure to the piston-cylinder assembly 15 by actuating, in the proper direction, control valve 21 to lower the push platen 13. Align the strut assuring clearance between the strut mounting studs and the stand-offs 34.

Once the strut is securely mounted and properly positioned, compress the strut spring about 1 inch. This will compress the spring and relieve shock absorber tension.

Through access hole 35 remove the upper shock absorber mounting nut, and then slowly bleed off the pressure by actuating control valve 21 until the spring is fully decompressed and the push-platen is completely withdrawn.

In cases where strut designs utilize a spring which is longer than the cylinder rod length it is necessary to release the spring pressure until the cylinder rod is nearly completely retracted. Then insert the lock pins 27 into the positioning holes 26 just above the push platen assembly 13. Then bleed pressure from cylinder, further retracting the piston rod, so that the lock pins 27 securing the upper platen assembly 14 can be removed.

Apply pressure to raise the cylinder to its highest position and secure it in place with the lock pins 27.

Apply pressure and remove the lower lock pins 27 which are above the push platen 13, and then slowly relieve the pressure until the spring is completely relaxed and the push plate is fully withdrawn.

Once the spring pressure is relieved the strut may then be removed for repair or overhaul.

To reassemble the strut, the procedure is reversed. Position the upper platen, with cylinder rod 22 retracted, above the decompressed strut.

Secure the upper-platen by inserting a pair of lock pins 27 through guide holes 25 and positioning holes 26.

Pressurize the cylinder 20 to compress the strut spring until the shock absorber mounting nut can be replaced through access hole 35.

Once the upper shock absorber mounting nut is secured, release cylinder pressure by actuating control valve 21 completely retracting the push-platen assembly 13. The base can now be dismantled and the repaired MacPherson Strut may be safely removed.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for use in assembling and disassembling a strut assembly of the type having a shock absorber axially disposed within a coil spring, comprising in combination
   a plurality of upright support rails,
   a first platen fixedly mounted to said support rails,
   a second platen slidably disposed on said support rails,
   a plurality of stand-off members depending from said second platen toward said first platen for engagement with said strut,
   an opening centrally disposed with respect to said stand-off members through which a tool may be inserted for disassembly of said strut,
   said first and second platens including means for holding said coil spring in a compressed condition therebetween,
   a third platen slidably disposed on said support rails,
   a fluid operated piston-cylinder assembly mounted between said second and third platens for moving said platens apart, and
   means for fixedly connecting said second and third platens to said support rails at adjustable positions thereon to restrain said second and third platens against movement relative to said first platen.

2. Apparatus for use in assembling and disassembling a strut assembly of the type having a shock absorber axially disposed within a coil spring, comprising in combination
   a plurality of upright support rails,
   a first platen fixedly mounted to said support rails,
   a first part fixedly secured to said support rails,
   a second part interlockable to said first part in coplanar relationship therewith,
   an opening through said first platen partially defined by said first and second parts,
   a second platen slidably disposed on said support rails,
   said first and second platens including means for holding said coil spring in a compressed condition therebetween,
   a third platen slidably disposed on said support rails,
   a fluid operated piston-cylinder assembly mounted between said second and third platens for moving said platens apart, and
   means for fixedly connecting said second and third platens to said support rails at adjustable positions thereon to restrain said second and third platens against movement relative to said first platen, and
   a shim member mounted to one face of said second part,
   said second part being interlockable with said one part with said one face in either a top or a bottom position.

3. Apparatus according to claim 1 wherein said plurality of stand-off members comprises
   a plurality of radially disposed plates each having one edge fixed to said second platen.

4. Apparatus according to claim 1 wherein said first platen comprises
   first and second substantially flat parts removably connected together in coplanar relationship,
   a shim mounted to one face of said first part, and
   said first part being connected to said second part with said one face on either the top or the bottom.

5. Apparatus according to claim 1 comprising
   safety shield means depending from said second platen for preventing the upper end of said strut from moving transversely out of engagement with said stand-off members.

* * * * *